United States Patent [19]
Yoshida et al.

[11] Patent Number: 5,479,435
[45] Date of Patent: Dec. 26, 1995

[54] DC ARC FURNACE

[75] Inventors: Hironobu Yoshida, Urayasu; Shinichi Tsukizaki, Chiba, both of Japan

[73] Assignee: Ishikawajima-Harima Jukogyo Kabushiki Kaisha, Tokyo, Japan

[21] Appl. No.: 335,696

[22] PCT Filed: Apr. 14, 1994

[86] PCT No.: PCT/JP94/00617

§ 371 Date: Nov. 16, 1994

§ 102(e) Date: Nov. 16, 1994

[87] PCT Pub. No.: WO94/24503

PCT Pub. Date: Oct. 27, 1994

[30]    Foreign Application Priority Data

Apr. 15, 1993 [JP] Japan .................................. 5-88803

[51] Int. Cl.⁶ ........................................................ F27B 3/18
[52] U.S. Cl. .................. 373/81; 373/108; 373/80
[58] Field of Search ........................ 373/79, 80, 81, 373/108

[56]          References Cited

U.S. PATENT DOCUMENTS 3,598,888  8/1971  Tada ............................. 373/80
4,001,488  1/1977  Bruff et al. ..................... 373/81
4,995,051  2/1991  Hakulin et al. ................. 373/81

FOREIGN PATENT DOCUMENTS 2611876   9/1988   European Pat. Off. .
2627578   4/1989   France .
3621323   1/1987   Germany .
56-47505  11/1981  Japan .
2-24290   2/1990   Japan .

*Primary Examiner*—Tu Hoang
*Attorney, Agent, or Firm*—Oblon, Spivak, McClelland, Maier & Neustadt

[57]           ABSTRACT

Provided are a furnace shell with a lower electrode at a bottom of the shell, a furnace roof adapted to close an upper portion of the furnace shell, a material charge port substantially at a center of the furnace roof and two upper electrodes positioned laterally opposite to each other with respect to the material charge port and vertically extending through the furnace roof. Scrap material is continuously charged through the material charge port and arcs are directed to the scrap material at a center of the furnace shell.

4 Claims, 6 Drawing Sheets

DC ARC FURNACE

TECHNICAL FIELD

The present invention relates to a DC arc furnace for melting scrap or pig iron in the form of a cold block (hereinafter referred to as scrap material).

BACKGROUND ART

There has been used a DC arc furnace as shown in FIGS. 1 and 2 to melt scrap material.

The PC arc furnace comprises a furnace shell 2 with a bottom electrode 1 (anode) at its bottom, a furnace roof 3 adapted to close an upper portion of the furnace shell 2, an upper electrode 4 (cathode) vertically extending through the roof 3 at a center thereof, a dust collecting duct 5 connected to the roof 3, a roof opening-and-closing device 6 which supports the roof 3 for vertical and pivotal movements of the latter and an electrode rising-and-lowering device 7 mounted on the roof opening-and-closing device 6 for vertically moving the upper electrode 4.

The furnace shell 2 is rockably supported by a lower supporting stand 8 through a rocker 9. With the roof 3 being released, the furnace shell 2 is tilted by a tilting drive 10 to take out molten steel 11 in the furnace shell 2 through a spout 12 into a ladle 14 on a ladle carriage 13.

In an operation for melting scrap material 15, the roof opening-and-closing device 6 lifts up the roof 3 and swing it outwardly of the furnace shell 2, thereby opening the top of the furnace shell 2. The scrap material 15 which has been preheated by a preheating device (not shown) arranged at a separate position is charged into the furnace shell 2, using a bucket or the like. Then, the top of the furnace shell 2 is closed with the roof 3. With suction in the furnace shell 2 being made by the dust collecting duct 5, the upper electrode 4 is lowered to a predetermined position and the electrodes 1 and 4 are energized to generate and maintain arc 16 to melt the scrap material 15.

In this case, substantial weight of the scrap material 15 is little in comparison to quantity thereof and a desired quantity of molten metal cannot be obtained only by one melting operation. Therefore, after the completion of one melting operation, the electrodes 1 and 4 are de-energized, the furnace roof 3 is opened and new scrap material is charged into the furnace shell 2. Thus, the scrap material melting operation is repeated several times in the manner described above. Thereafter, the furnace shell 2 is tilted by the drive 10 to pour the molten metal 11 through the spout 12 into the ladle 14.

In the conventional DC arc furnace of the type described above, whenever the scrap material is to be charged into the furnace shell 2, the furnace roof 3 is released. Such release of the roof 3 causes various adverse problems. High-temperature exhaust gases are dispersed outside of the furnace shell 2 so that a considerably large quantity of heat is dissipated to the outside, resulting in a large amount of heat loss. Also a considerably large quantity of dust is spread and noise is generated. When additional scrap material 15 is being charged into the furnace shell 2, the melting operation is shut down so that arc time loss occurs and the temperature of the molten metal drops, resulting in substantial decrease of the melting efficiency.

Moreover, arc 16 between the scrap material 15 and the upper electrode 4 in the furnace shell 2 may be quickly moved over the scrap material so that flicker and/or short circuit occurs, resulting in great voltage fluctuation in the power source system.

In order to overcome the above-mentioned problems, a continuously charged type DC arc furnace as shown in FIG. 3 has been proposed which has a material charging port 17 on a side of the furnace shell 2 or as shown by an imaginary line on the furnace roof 3 and adjacent to the upper electrode 4. The scrap material 15 is continuously charged by a delivery device 17a through the charging port 17 into the furnace shell 2 so as to overcome the above-mentioned problems due to opening and closing of the roof 3 and due to flicker.

However, the continuously charged type DC arc furnace as shown in FIG. 3 has also various problems. Since the scrap material 15 is additionally charged sideways of the upper electrode 4, the added scrap material 15 is always piled up in the furnace shell 2 at an offset position, which makes temperature distribution in the furnace shell 2 asymmetric and requires a separate heating device, or delay in melting time period is caused due to unmelted scrap material, which substantially lowers the melting efficiency. Moreover, since the melting is mainly effected at the offset position in the furnace shell 2 adjacent to a peripheral wall 23 of the furnace, the furnace shell 2 tends to receive local wear.

SUMMARY OF THE INVENTION

The present invention was made to overcome the above problems encountered in the prior art and has for its object to provide a DC arc furnace in which scrap material can be continuously charged between two upper electrodes and an arc between these electrodes is directed to the scrap material at the center of the furnace shell to thereby enhance the efficiency of melting the scrap material, compact the furnace shell in size, prevent the peripheral wall of the furnace shell from being worn and enhance the heat efficiency.

According to the present invention, with a predetermined quantity of scrap material being charged in a furnace shell with its upper portion being closed by a furnace roof, upper electrodes are lowered to a predetermined position and energization is made between a bottom electrode and the upper electrodes to generate and maintain an arc to melt the material. After melting of the material progresses to a certain degree, the material is additionally and continuously charged at the material charge port with constant quantities. In this case, the material through the material charge port is fed just between the upper electrodes and moreover arcs from the two upper electrodes are mutually directed to the scrap material having been charged toward the center of the furnace shell, thereby enhancing the melting efficiency of the material.

According to the present invention, the material preheating and charging device may be installed above the material charge port so that the scrap material can be directly heated by high-temperature exhaust gases from the furnace shell, thereby enhancing the efficiency of melting the material and saving the charged heat to the DC arc furnace to lower the running cost.

BEST MODE FOR CARRYING OUT THE INVENTION

An embodiment of the present invention will be described in conjunction with the accompanying drawings.

Figure 1:
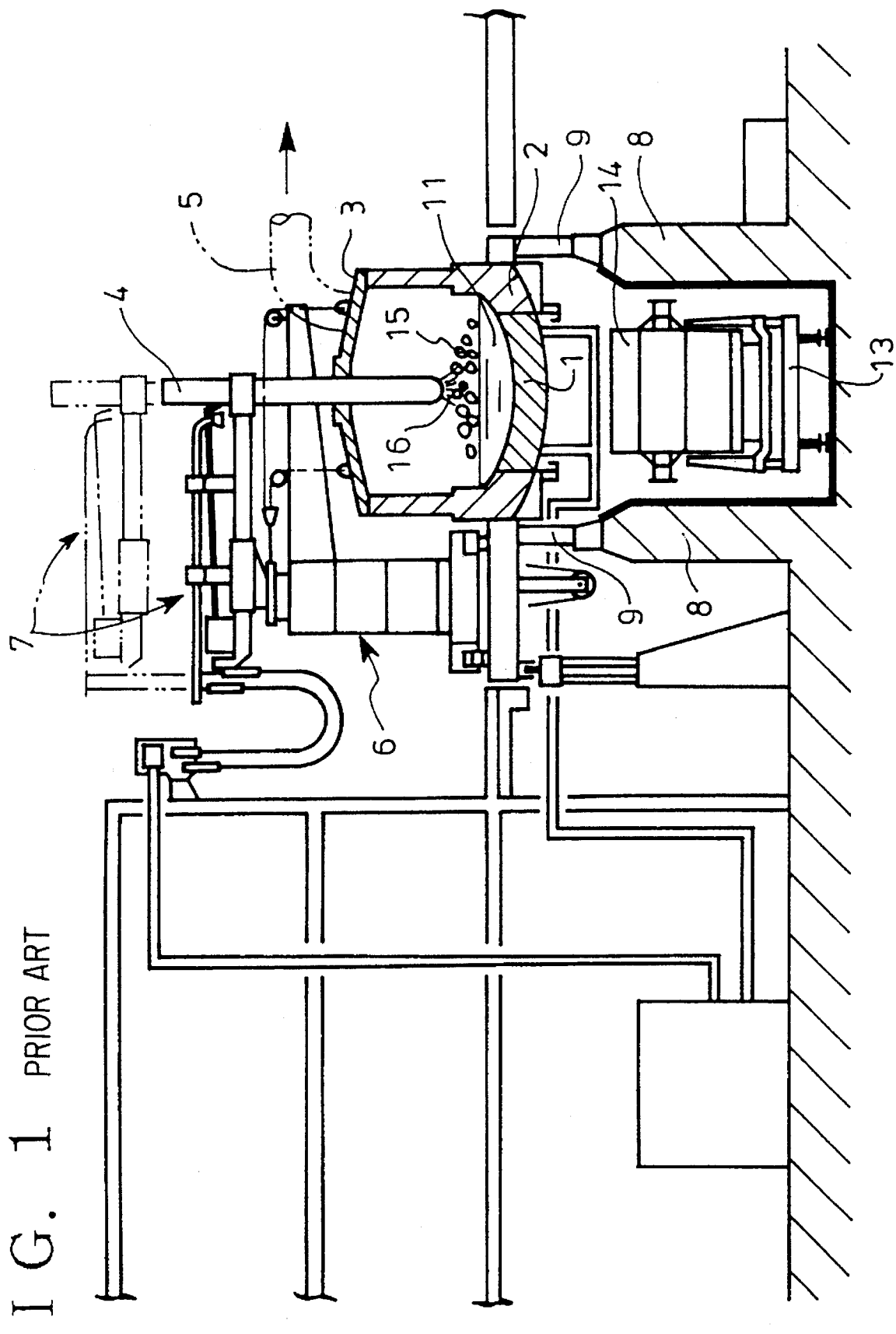
FIG. 1 is a front view in section of a conventional DC arc furnace.
Figure 2:
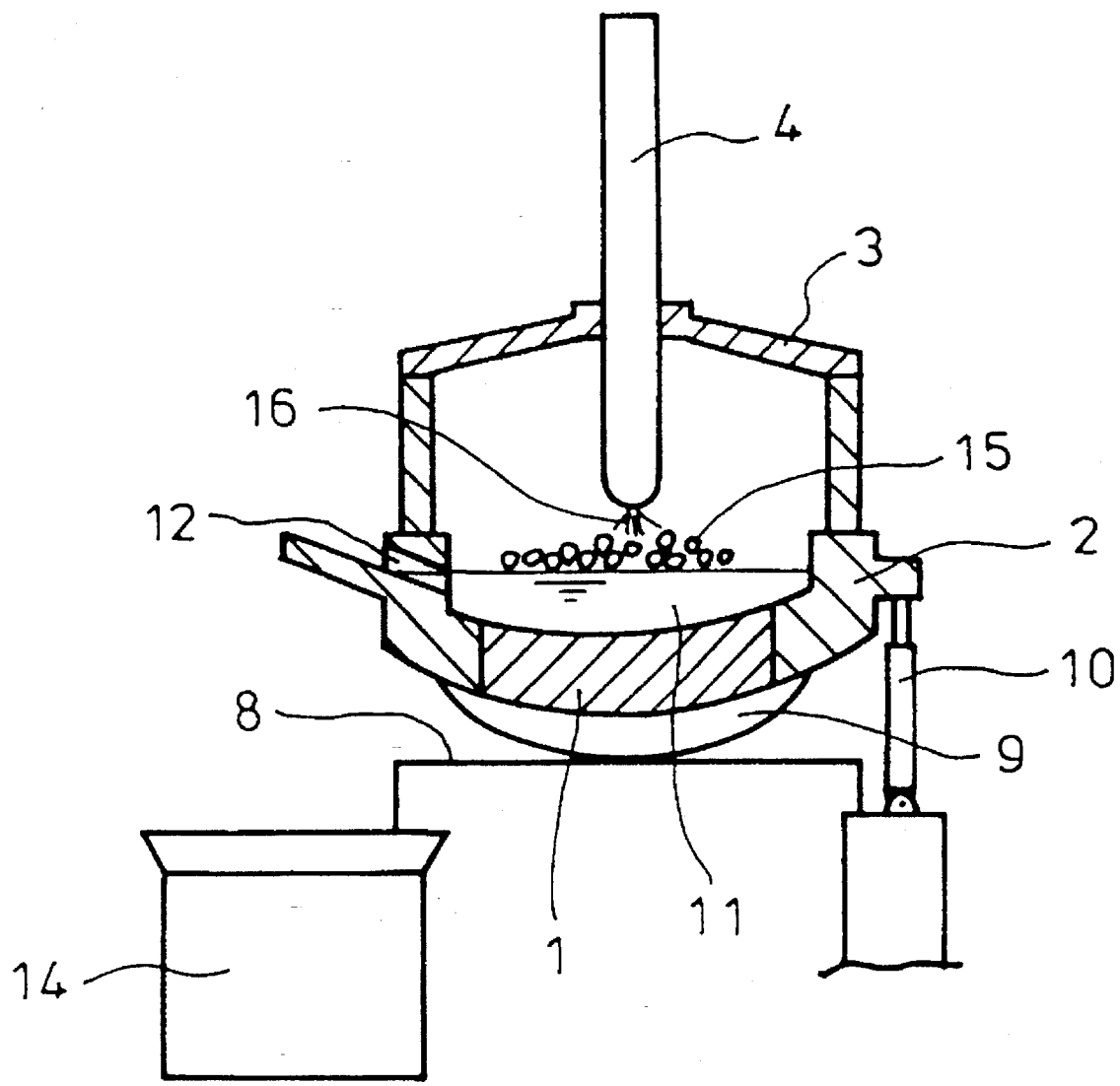
FIG. 2 is a side view in section of FIG. 1.
Figure 3:
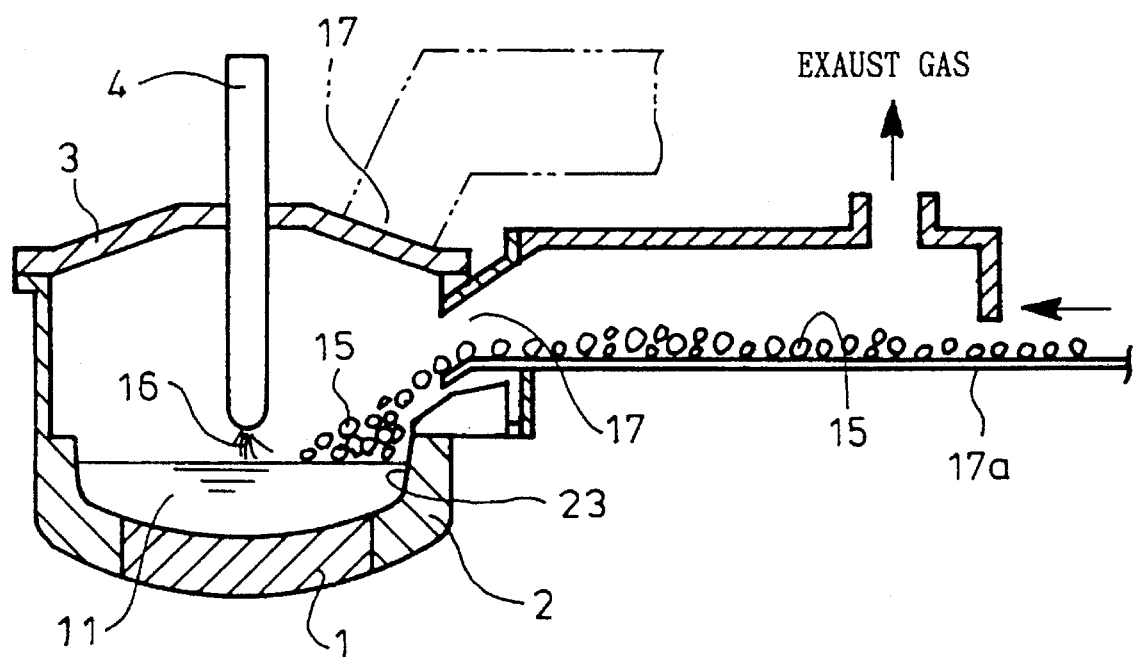
FIG. 3 is a sectional view of a conventional continuously charged type DC arc furnace.
Figure 4:
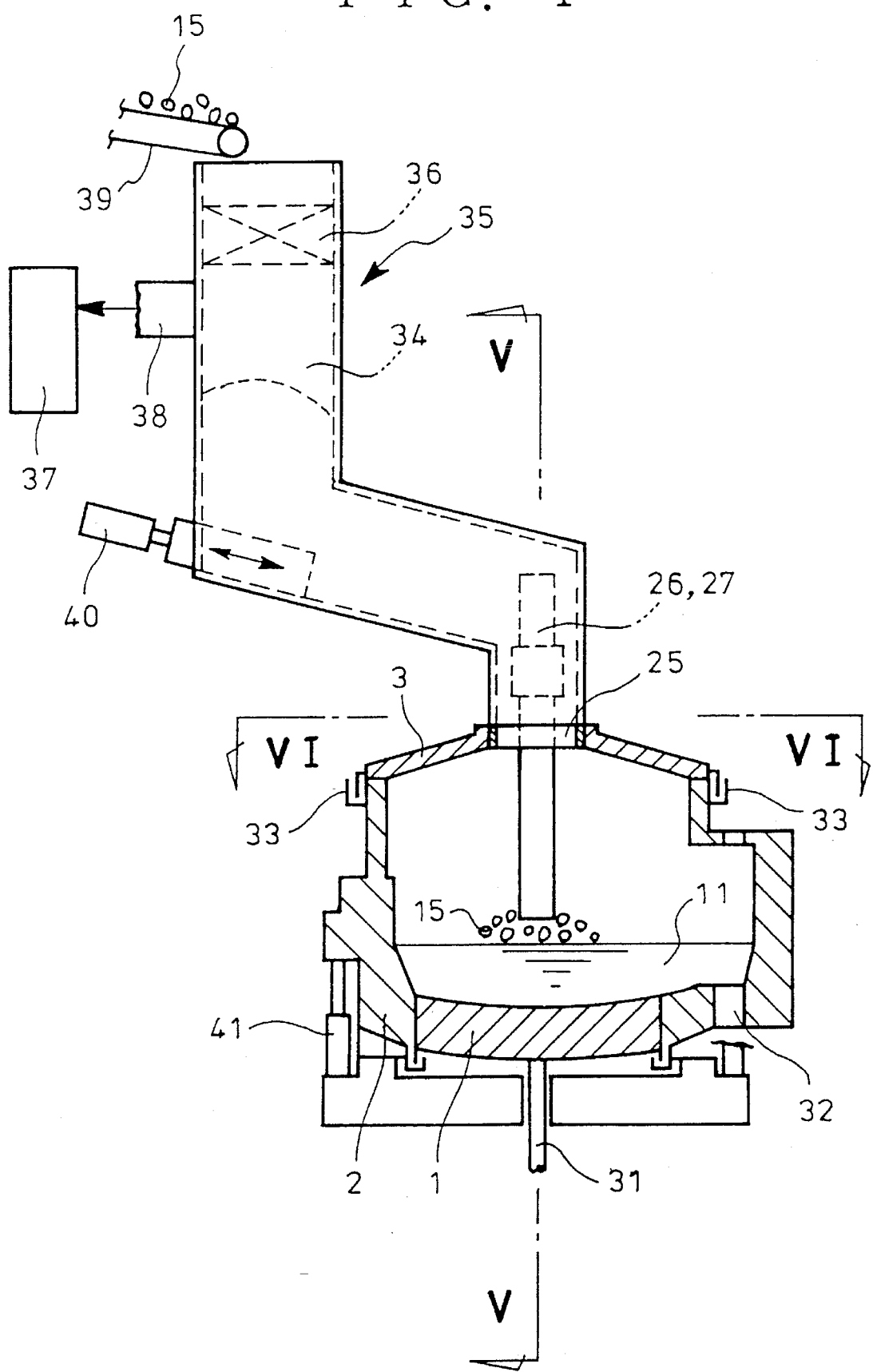
FIG. 4 is a side view in section of an embodiment of the present invention.
Figure 5:
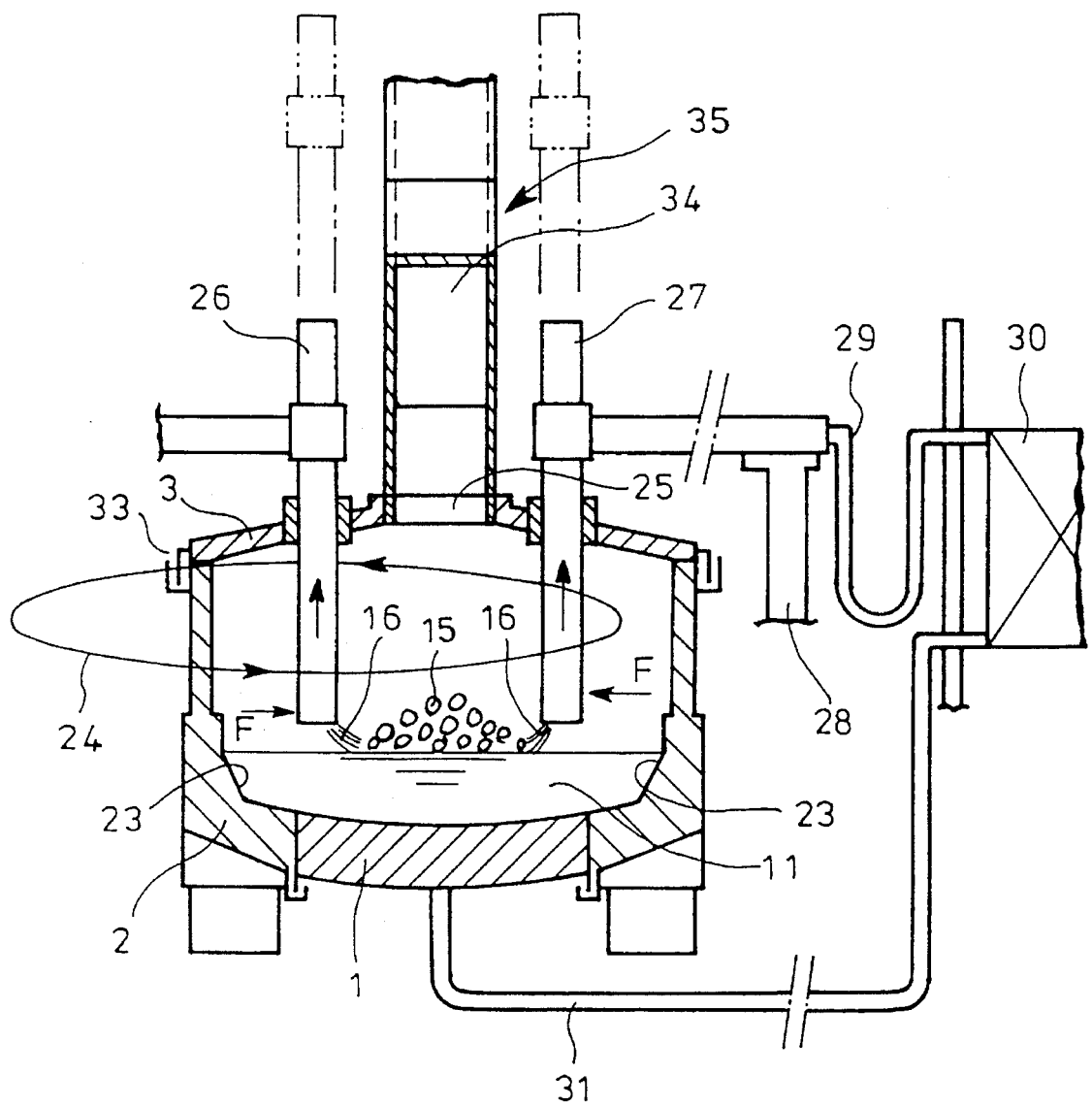
FIG. 5 is a view looking in the direction V—V in FIG. 4.
Figure 6:
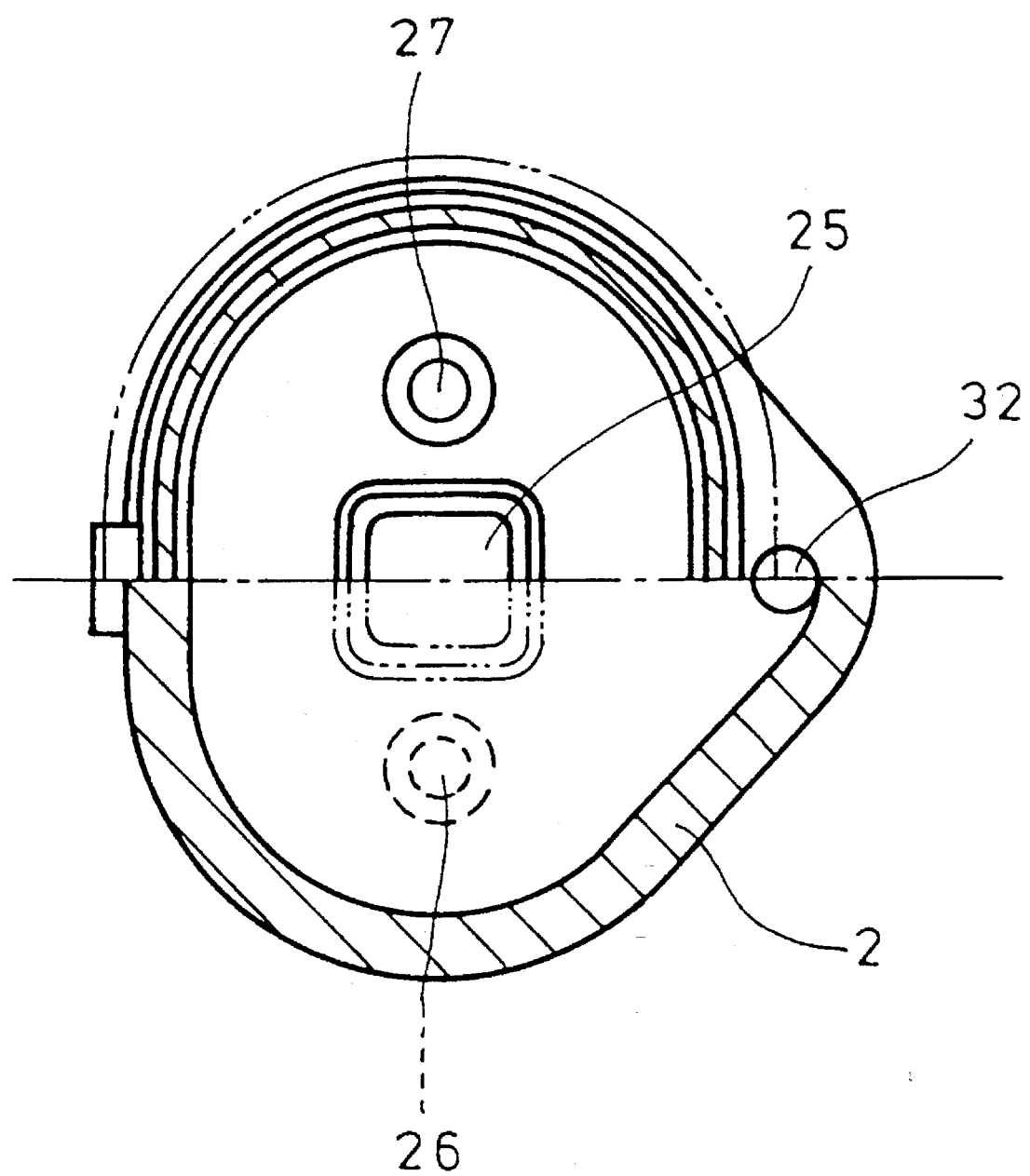
FIG. 6 is a view looking in the direction VI—VI in FIG. 4.

FIGS. 4 to 6 illustrate an embodiment of the invention. In the figures, parts which are the same as those shown in FIGS. 1 to 3 are denoted by the same reference numerals as those used in FIGS. 1 to 3.

A furnace shell 2 oval in cross section has a bottom electrode 1 at its bottom and is closed at its upper portion by a furnace roof 3. A material charging port 25 is formed through the roof 3 substantially at a center thereof. Two upper electrodes 26 and 27 extend through the roof 3 at opposite positions relative to the port 25 in a longitudinal direction of the oval.

The upper electrodes 26 and 27 are respectively supported by electrode lifting devices 28 such that they are vertically movable independently from each other. The upper electrodes 26 and 27 are connected through upper conductors 29 to a power source 30, respectively. The bottom electrode 1 is connected through a lower conductor 31 to the power sources 30.

The furnace shell 2, which is oval and has the upper electrodes 26 and 27 as cores has a spout 32 at a side perpendicular to the longitudinal direction of the oval which may be blocked by a mud gun or the like. The furnace roof 3 is mounted through sealing means 33 on the furnace shell 2 and may be removable upon, for example, maintenance of the furnace shell 2.

A material preheating and charging device 35 with a packed bed type heat exchanger 34 is arranged above the material charging port 25. Sealing means 36 such as a damper is arranged above the heat exchanger 34 of the material preheating and charging device 35. A portion of the device 35 below the sealing means 36 is connected through an exhaust piping 38 to an exhaust system 37 having a heat exchanger, a dust collector, a suction fan and the like. In the figure, reference numeral 39 denotes a material supply device for supplying the scrap material 15 to a portion of the device 35 above the sealing means 36; 40, a material charging device for pushing out the scrap material which has been preheated in the heat exchanger 34 to the material charging port 25 so as to effect substantially continuous charging; 41, a tilting device such as cylinder for tilting the furnace shell 2 upon maintenance or the like of the furnace shell 2 to discharge all of the molten metal 11 and slag in the furnace shell 2.

Upon melting of the scrap material 15, in the state that a predetermined quantity of scrap material 15 has been charged to the furnace shell 2 closed with the furnace roof 3, energization is made between the bottom electrode 1 and the upper electrodes 26 and 27 to generate an arc 16 for melting the scrap material 15. After the melting of the scrap material 15 progresses to a certain degree, the scrap material 15 is continuously charged through the material charged port 25 by constant volumes. In this case, the scrap material 15 from the material charge port 25 is charged just between the two upper electrodes 27 and 28. Therefore, the melting progresses with the temperature distribution in the furnace shell 2 being symmetric, whereby no unmelted scrap material remains and the melting efficiency is enhanced.

Moreover, the arcs 16 from the respective upper electrodes 26 and 27 are directed to the center at which the scrap material is charged, whereby the continuously charged scrap material 15 can be melted further effectively.

This will be explained more specifically. With the electric current flowing through one upper electrode 26 in a direction (upward direction) as shown by arrow in FIG. 5, a right-handed magnetic field 24 is generated in accordance with the right-handed screw rule. With respect to the other upper electrode 27 crossing the right-handed magnetic field 24, the arc 16 from the other electrode 27 receives force F directed from right to left on the figure in accordance with Fieming's left-hand rule on the basis of direction (upward direction) of the electric current flowing through the electrode 27 and direction (perpendicular to the figure and directed from front to rear of the sheet of the figure) of the magnetic field. In the same way, the arc 16 from the one upper electrode 26 crossing the magnetic field 24 generated by the other upper electrode 27 receives force F directed from left to right since the magnetic field 24 is directed back to front in the direction perpendicular to the sheet of the figure. As a result, the arcs 16 of the upper electrodes 26 and 27 are mutually directed to the center so that the scrap material 15 fed to the very center can be effectively melted.

The upper electrodes 26 and 27 (in the form of carbon electrodes) are expensive and tend to be severely consumed due to oxidization and therefore are required to have as small outer surfaces as possible. To this end, in order to supply the scrap material 15 between the upper electrodes 26 and 27, the minimum number of, i.e., two upper electrodes 26 and 27 are arranged to minimize the consumption of the electrodes.

After the predetermined quantity of scrap material 15 is melted, then the spout 32 is opened by opening moans (not shown) to take out the molten steel 11. In this case, a quantity of molten steel 11 is left at the bottom of the furnace shell 2 so as to assure electric conductivity in a next melting operation.

In the case where maintenance of the furnace shell 2 is required, the upper electrodes 26 and 27 are drawn out of the furnace roof 3; alternatively, the furnace shell 3 is removed. Then, the furnace shell 2 is tilted by the tilting device 41 to discharge all of the molten steel 11 and molten slag left at the bottom of the furnace shell 2.

According to the above-mentioned embodiment, in comparison with the conventional continuous charged type DC arc furnace, the arcs 16 are directed to the scrap material 15 charged at the center of the furnace shell so that melting of the scrap material 15 can be made in a shorter time period and more efficiently. Moreover, the temperature distribution in the furnace is symmetric so that the melting efficiency is further enhanced and wear of the peripheral wall 23 of the furnace can be reduced.

Moreover, with the material preheating and charging device 35 arranged at the material charge port 25, the scrap material 15 may be directly heated by the high-temperature exhaust gas from the furnace shell 2 and continuous charging can be made without opening or the furnace roof 3, which enhances the efficiency of melting the scrap material 15 as well as saves the charged heat to the DC arc furnace to reduce the running cost.

It is to be understood that the present invention is not limited to the above-mentioned embodiment and that various modifications may be made without leaving the true spirit of the present invention. For example, the furnace shell may be oval, flat oval, rectangle or the like. The material preheating and charging device used may be of various modes or types.

INDUSTRIAL APPLICABILITY

In a DC arc furnace for melting scrap material, the scrap material is continuously charged through a material charge port between two upper electrodes and arcs are directed to the scrap material at a center of a furnace shell, which will be suitable for enhancement of the efficiency of melting the scrap material, compacting of the furnace shell in size, preventing of wear of a peripheral wall of the furnace shell and reduction of the charged heat.

We claim:

1. A DC arc furnace comprising:

a furnace shell with a lower electrode at a bottom thereof;

a furnace roof adapted to close an upper portion of said furnace shell;

a single, material charge and exhaust gas port substantially at a center of said furnace roof;

two upper electrodes positioned laterally opposite to each other with respect to said port and vertically extending through said furnace roof; and a material preheating and charging device with a packed bed type heat exchanger positioned above said port and laterally offset with respect to said port as well as a material charger for pushing out scrap material, which has been preheated by said heat exchanger into said port.

2. A furnace according to claim 1 wherein the material preheating and charging device is connected to an exhaust system arranged above the material charge and exhaust gas port.

3. A furnace according to claim 1 further comprising:

a tilting means for tilting the furnace to cause molten material to be discharged from the furnace.

4. A furnace according to claim 1 wherein the scrap material is charged into the furnace by the material charger at a continuous rate.

* * * * *